(12) United States Patent
Sugiyama et al.

(10) Patent No.: US 9,698,615 B2
(45) Date of Patent: Jul. 4, 2017

(54) ELECTRIC VEHICLE AND METHOD OF CONTROLLING ELECTRIC VEHICLE

(71) Applicants: Yoshinobu Sugiyama, Toyota (JP); Keiji Kaita, Miyoshi (JP); Takahiko Hirasawa, Toyota (JP); Yasuomi Takeuchi, Toyota (JP)

(72) Inventors: Yoshinobu Sugiyama, Toyota (JP); Keiji Kaita, Miyoshi (JP); Takahiko Hirasawa, Toyota (JP); Yasuomi Takeuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 725 days.

(21) Appl. No.: 14/164,808

(22) Filed: Jan. 27, 2014

(65) Prior Publication Data
US 2014/0217812 A1 Aug. 7, 2014

(30) Foreign Application Priority Data

Feb. 1, 2013 (JP) ................ 2013-018123

(51) Int. Cl.
*H02H 7/18* (2006.01)
*H02J 7/00* (2006.01)
(Continued)

(52) U.S. Cl.
CPC ............ *H02J 7/0054* (2013.01); *B60L 1/003* (2013.01); *B60L 11/005* (2013.01); *B60L 11/123* (2013.01); *B60L 11/14* (2013.01); *B60L 11/1859* (2013.01); *B60L 11/1861* (2013.01); *B60L 11/1864* (2013.01); *B60L 11/1868* (2013.01); *B60L 11/1887* (2013.01); *B60L 2210/10* (2013.01); *B60L 2210/40* (2013.01); *B60L 2220/14* (2013.01); *B60L 2240/527* (2013.01); *B60L 2240/547* (2013.01);
(Continued)

(58) Field of Classification Search
USPC ........................................ 307/10.7
See application file for complete search history.

(56) References Cited

U.S. PATENT DOCUMENTS

| 8,779,947 B2 * | 7/2014 | Tengler ................. H04W 4/00 307/10.7 |
| 2007/0170781 A1 * | 7/2007 | Jabaji ..................... B60L 1/00 307/10.1 |

FOREIGN PATENT DOCUMENTS

| JP | A-2006-174619 | 6/2006 |
| JP | A-2006-230102 | 8/2006 |

(Continued)

*Primary Examiner* — Rexford Barnie
*Assistant Examiner* — Dru Parries
(74) *Attorney, Agent, or Firm* — Oliff PLC (57) ABSTRACT

An electric vehicle includes: a storage device configured to store power used for traveling; an auxiliary battery configured to store power supplied to an auxiliary load; a converter configured to charge the auxiliary battery by using power supplied from the storage device; and a shut-off device configured to switch between a supply condition in which power is supplied to the auxiliary load from the auxiliary battery and a shut-off condition in which power is not supplied to the auxiliary load from the auxiliary battery. During control of the electric vehicle, the converter is controlled such that an output voltage of the converter is higher when the shut-off device is in the shut-off condition than when the shut-off device is in the supply condition.

7 Claims, 4 Drawing Sheets (51) Int. Cl.
- *B60L 1/00* (2006.01)
- *B60L 11/00* (2006.01)
- *B60L 11/12* (2006.01)
- *B60L 11/14* (2006.01)
- *B60L 11/18* (2006.01)

(52) U.S. Cl.
CPC ... *B60L 2240/549* (2013.01); *B60L 2240/622* (2013.01); *B60L 2250/16* (2013.01); *Y02T 10/6217* (2013.01); *Y02T 10/7005* (2013.01); *Y02T 10/7022* (2013.01); *Y02T 10/7044* (2013.01); *Y02T 10/7061* (2013.01); *Y02T 10/7066* (2013.01); *Y02T 10/7077* (2013.01); *Y02T 10/7216* (2013.01); *Y02T 10/7241* (2013.01); *Y02T 10/7291* (2013.01); *Y02T 90/16* (2013.01); *Y02T 90/162* (2013.01); *Y02T 90/34* (2013.01)

(56) References Cited

FOREIGN PATENT DOCUMENTS

| | | |
|---|---|---|
| JP | 2010183758 A | 8/2010 |
| JP | 2012175819 A | 9/2012 |

* cited by examiner

ELECTRIC VEHICLE AND METHOD OF CONTROLLING ELECTRIC VEHICLE

The disclosure of Japanese Patent Application No. 2013-018123, filed on Feb. 1, 2013 including the specification, drawings and abstract is incorporated herein by reference in its entirety.

BACKGROUND OF THE INVENTION

1. Field of the Invention

The invention relates to an electric vehicle, and more particularly to an electric vehicle including a storage device for travel and an auxiliary battery (AB).

2. Description of Related Art

Japanese Patent Application Publication No. 2006-174619 (JP 2006-174619 A) discloses a hybrid vehicle (HV) serving as an example of an electric vehicle. In this HV, an AB is charged by transmitting electricity to the AB from a main battery (MB) via a direct current to direct current (DC/DC) converter at fixed time intervals after an ignition switch is switched OFF. In so doing, the AB can be prevented from going flat (see JP 2006-174619 A).

SUMMARY OF THE INVENTION

In an electric vehicle such as that of JP 2006-174619 A, the AB is charged with power from the MB, and therefore the AB can be reduced in size. When the AB is reduced in size, however, a state of charge (SOC) of the AB is more likely to decrease due to natural discharge and the like occurring during long-term parking. When the SOC of the AB decreases, deterioration of the AB advances. When charging is performed on an AB such as that disclosed in JP 2006-174619 A in a condition where an amount of charge of the AB is small, however, a charging frequency increases.

The invention provides an electric vehicle in which deterioration of an AB installed therein is suppressed, and a method of controlling the electric vehicle.

A first aspect of the invention relates to an electric vehicle. The electric vehicle includes a storage device, an AB, a converter, a shut-off device, and a controller. The storage device is configured to store power used for traveling. The AB is configured to store power supplied to an auxiliary load. The converter is configured to charge the AB by using power supplied from the storage device. The shut-off device is configured to switch between a supply condition in which power is supplied to the auxiliary load from the AB and a shut-off condition in which power is not supplied to the auxiliary load from the AB. The controller is configured to control the converter such that an output voltage of the converter is higher when the shut-off device is in the shut-off condition than when the shut-off device is in the supply condition.

In the electric vehicle described above, the controller may be configured to start increasing the output voltage when the shut-off device is switched from the supply condition to the shut-off condition.

In the electric vehicle described above, the controller may be configured to cancel an increase applied to the output voltage when the shut-off device is switched from the shut-off condition to the supply condition.

In the electric vehicle described above, the controller may be configured not to increase the output voltage after the increase applied to the output voltage has been canceled, even when the shut-off device is switched to the shut-off condition again.

In the electric vehicle described above, the electric vehicle may further include a notification device. The notification device may be configured to notify a user of an increase in the output voltage.

In the electric vehicle described above, the shut-off device may be configured to be operated by a user. In the electric vehicle described above, the shut-off device may be a fuse that is attachable and detachable between the AB and the auxiliary load.

In the electric vehicle described above, the auxiliary load may be a navigation system or an audio device.

A second aspect of the invention relates to a method of controlling an electric vehicle. The electric vehicle includes a storage device, an AB, a converter, a shut-off device, and a controller. The storage device is configured to store power used for traveling. The AB is configured to store power that is supplied to an auxiliary load. The converter is configured to charge the AB using power supplied from the storage device. The shut-off device is configured to switch between a supply condition in which power is supplied to the auxiliary load from the AB and a shut-off condition in which power is not supplied to the auxiliary load from the AB. The method includes controlling the converter using the controller such that an output voltage of the converter is higher when the shut-off device is in the shut-off condition than when the shut-off device is in the supply condition.

In the invention, the output voltage of the converter is increased when the shut-off device is in the shut-off condition relative to when the shut-off device is in the power supply condition. In so doing, long-term parking of the electric vehicle can be predicted in accordance with the condition of the shut-off device, and when long-term parking is predicted, the output voltage of the converter can be increased. As a result, a SOC of the AB can be increased in advance, thereby preventing overdischarge during long-term parking. Hence, according to the invention, deterioration of the AB installed in the electric vehicle can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described in detail below with reference to the drawings. Note that identical or corresponding parts have been allocated identical reference symbols, and duplicate description thereof has been omitted.

Figure 1:
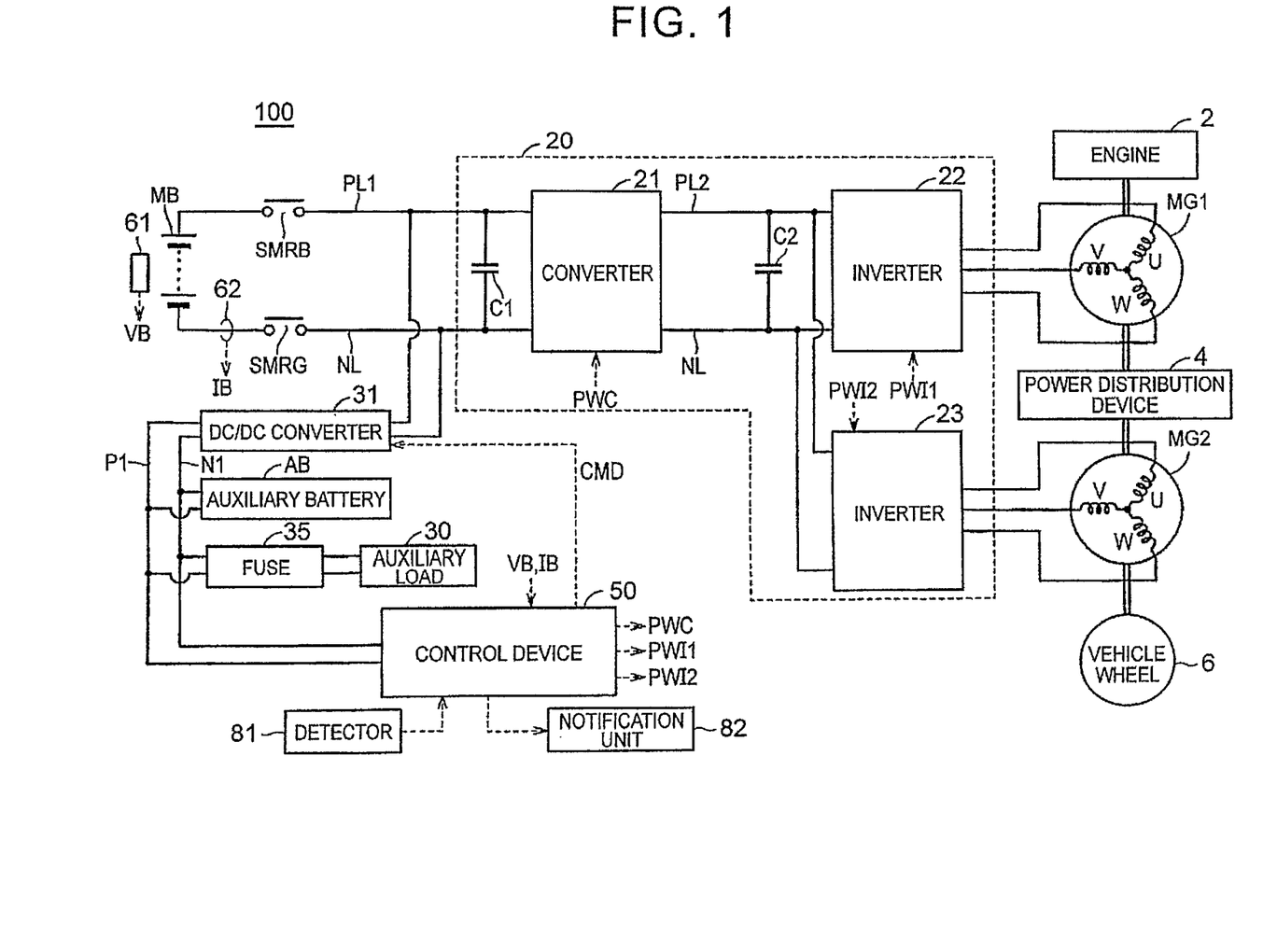
FIG. 1 is a block diagram showing an overall configuration of an electric vehicle according to an embodiment of the invention.

FIG. 1 is a block diagram showing an overall configuration of an electric vehicle according to an embodiment of the invention. Referring to FIG. 1, an electric vehicle 100 includes an engine 2, motor/generators (MGs)—MG1 and MG2—, a power distribution device 4, a vehicle wheel 6, a main battery MB, system main relays (SMRs)—SMRB and SMRG—and a power control unit (PCU) 20. The electric vehicle 100 also includes an auxiliary battery AB, an auxiliary load 30, a DC/DC converter 31, a fuse 35, a controller 50, a voltage sensor 61, and a current sensor 62. The electric vehicle 100 further includes a detector 81 and a notification device 82.

The electric vehicle 100 is a HV that travels using the engine 2 and the MG2 as power sources. Driving force generated by the engine 2 and the MG2 is transmitted to the vehicle wheel 6.

The engine 2 is an internal combustion engine such as a gasoline engine or a diesel engine that outputs power by burning fuel. The engine 2 is configured such that operating conditions thereof such as a throttle opening (an intake air amount), a fuel supply amount, and an ignition timing can be controlled electrically by signals from the controller 50.

The MG1, MG2 are alternating current rotating electric machines such as three-phase alternating current synchronous motors, for example. The MG1 is used as a power generator driven by the engine 2 and a rotating electric machine capable of starting the engine 2. Power obtained from the power generation performed by the MG1 can be used to charge the MB and to drive the MG2. The MG2 is used mainly as a rotating electric machine that drives the vehicle wheel 6 of the electric vehicle 100.

The power distribution device 4 includes a planetary gear mechanism having three rotary shafts, namely a sun gear, a carrier, and a ring gear, for example. The sun gear is coupled to a rotary shaft of the MG1. The carrier is coupled to a crankshaft of the engine 2. The ring gear is coupled to a drive shaft. The power distribution device 4 divides the driving force of the engine 2 into power transmitted to the rotary shaft of the MG1 and power transmitted to the drive shaft. The drive shaft transmits the driving force to the vehicle wheel 6. The drive shaft is also coupled to a rotary shaft of the MG2.

The MB is a chargeable-dischargeable DC power supply constituted by a secondary battery such as a nickel hydrogen battery or a lithium ion battery, a capacitor, or the like, for example. The MB supplies electric power to the PCU 20, and is charged with power from the PCU 20 during power regeneration. Power stored in the MB can also be used to charge the AB via the DC/DC converter 31. An output voltage of the MB is set at 201.6 V, for example.

The voltage sensor 61 detects an inter-terminal voltage VB of the MB and outputs the detected voltage VB to the controller 50. The current sensor 62 detects a current IB flowing to the MB and outputs the detected current IB to the controller 50.

The SMRB and SMRG switch the MB and the PCU 20 and DC/DC converter 31 between a conductive condition and a non-conductive condition on the basis of a signal from the controller 50.

The PCU 20 includes a converter 21, inverters 22, 23, and capacitors C1, C2. The converter 21 performs power conversion between a positive and negative electrode lines PL1 and NL and a positive and negative electrode lines PL2 and NL on the basis of a control signal PWC from the controller 50.

The inverters 22, 23 are connected in parallel with each other to the positive electrode line PL2 and the NL. The inverter 22 drives the MG1 by converting DC power supplied from the converter 21 into alternating current power on the basis of a signal PWI1 from the controller 50. The inverter 23 drives the MG2 by converting DC power supplied from the converter 21 into alternating current power on the basis of a signal PWI2 from the controller 50.

The capacitor C1 is provided between the positive electrode line PL1 and the NL in order to reduce voltage variation between the positive electrode line PL1 and the NL. Further, the capacitor C2 is provided between the positive electrode line PL2 and the NL in order to reduce voltage variation between the positive electrode line PL2 and the NL.

The DC/DC converter 31 steps down the voltage of the MB to a predetermined voltage and outputs the stepped-down voltage to the AB. In other words, the DC/DC converter 31 functions as a charger that charges the AB. Further, the DC/DC converter 31 supplies power to the auxiliary load 30 and the controller 50 by stepping down the voltage of the MB to a predetermined voltage. An output voltage Vout of the DC/DC converter 31 is adjusted on the basis of a signal CMD from the controller 50.

The AB stores power to be supplied to the auxiliary load 30 and the controller 50. The AB is a chargeable-dischargeable DC power supply constituted by a secondary battery such as a nickel hydrogen battery or a lithium ion battery, or the like, for example. The AB is configured to output a lower voltage than the MB. The AB is charged by the DC/DC converter 31. According to a characteristic of the AB, capacity deterioration advances as a SOC decreases. An output voltage of the AB is set at 12 V, for example.

The auxiliary load 30 is an electric device that is activated upon reception of a supply of power from the AB. More specifically, the auxiliary load 30 is an electric device not related to travel by the electric vehicle 100, such as a navigation system or an audio device, for example. In other words, the auxiliary load 30 is an electric device that is not used during vehicle transportation and vehicle storage. A dark current flows to the auxiliary load 30 even when the auxiliary load 30 is not in an operative condition. A dark current is a standby current consumed when the auxiliary load 30 is inoperative. When the electric vehicle 100 is parked, the power stored in the AB is consumed by the dark current.

The fuse 35 is a fuse for reducing the dark current flowing to the auxiliary load 30. The fuse 35 is configured to be capable of switching the power supply from the AB to the auxiliary load 30 ON and OFF, and can be attached and detached freely between the AB and the auxiliary load 30. More specifically, the fuse 35 is disposed in a fuse box in an engine room. The fuse box is provided in series on an electric circuit from the AB to the auxiliary load 30. When the fuse 35 is removed from the fuse box, the aforesaid electric circuit enters a shut-off condition. When the fuse 35 is attached to the fuse box, the electric circuit enters a conductive condition.

The fuse 35 is configured to be operable by a user. More specifically, when the user detaches the fuse 35 from the fuse box, the electric circuit from the AB to the auxiliary load 30 is set in the shut-off condition. When the user attaches the fuse 35 to the fuse box, on the other hand, the electric circuit from the AB to the auxiliary load 30 is set in the conductive condition. Hence, by operating the fuse 35, the user can switch the power supply from the AB to the auxiliary load 30 ON and OFF.

When the vehicle is to be parked for a long period, such as during vehicle transportation and storage, the fuse 35 is detached from the fuse box by the user in order to reduce the dark current flowing to the auxiliary load 30. As a result, the electric circuit from the AB to the auxiliary load 30 is shut off such that the dark current no longer flows to the auxiliary load 30. When the long period of parking comes to an end, the fuse 35 is attached to the fuse box by the user. As a result, power is supplied to the auxiliary load 30 such that the auxiliary load 30 becomes usable. Note that the fuse 35 is operated only when the vehicle is to be parked for a long period and not during normal use of the vehicle.

Power is supplied from the AB to an electric device related to travel, such as the controller 50, at all times regardless of the condition of the fuse 35. A travel performance of the electric vehicle 100 is not therefore affected by the operation of the fuse 35. Power is likewise supplied at all times to an electric device for charging the AB, regardless of the condition of the fuse 35.

The detector 81 detects the condition of the fuse 35 and outputs a detection result to the controller 50. More specifically, the detector 81 detects whether the fuse 35 is attached to the fuse box or detached from the fuse box. As a result, the controller 50 can predict that the electric vehicle 100 is to be parked for a long period in advance.

The notification device 82 is a device for notifying the user that the output voltage Vout of the DC/DC converter 31 has been increased during charging control to be described below. For example, the notification device 82 is meter installed in the electric vehicle 100 or a display device of the navigation system or the like. The notification device 82 displays information on the basis of a signal from the controller 50. Note that the notification device 82 may be a communication device configured to be capable of communicating with a smartphone or the like carried by the user.

The controller 50 includes a central processing unit (CPU), a storage device, and an input/output buffer, none of which are shown in FIG. 1. The controller 50 receives signals input from respective sensors and so on, outputs control signals to respective devices, and controls the electric vehicle 100 and the respective devices. Note that this control is not limited to software processing, and may be realized by constructing dedicated hardware (electronic circuits).

The controller 50 receives the voltage VB from the voltage sensor 61 and the current IB from the current sensor 62. The controller 50 calculates an SOC indicating a SOC of the MB on the basis of the voltage VB and the current IB.

The controller 50 generates and outputs control signals for controlling the engine 2, the PCU 20, and the DC/DC converter 31. Here, the controller 50 is activated by power supplied from the AB. During an operation of the electric vehicle 100, the power stored in the AB is maintained so as not to decrease, but when the electric vehicle 100 is parked for a long period, the power stored in the AB gradually decreases due to natural discharge and the like.

In the configuration described above, the AB is preferably small. When the size of the AB is reduced, however, the SOC of the AB is more likely to decrease due to natural discharge and the like. During long-term parking in particular, a reduction in the SOC of the AB causes capacity deterioration of the AB to advance.

Hence, in this embodiment, when the fuse 35 is in the shut-off condition, the output voltage Vout of the DC/DC converter 31 is increased relative to when the fuse 35 is in the power supply condition. In so doing, long-term parking of the electric vehicle 100 can be predicted in accordance with the condition of the fuse 35, and when long-term parking is predicted, the output voltage Vout of the DC/DC converter 31 can be increased. Accordingly, the SOC of the AB can be increased in advance prior to long-term parking, and as a result, deterioration of the AB installed in the electric vehicle 100 can be suppressed.

Figure 2:
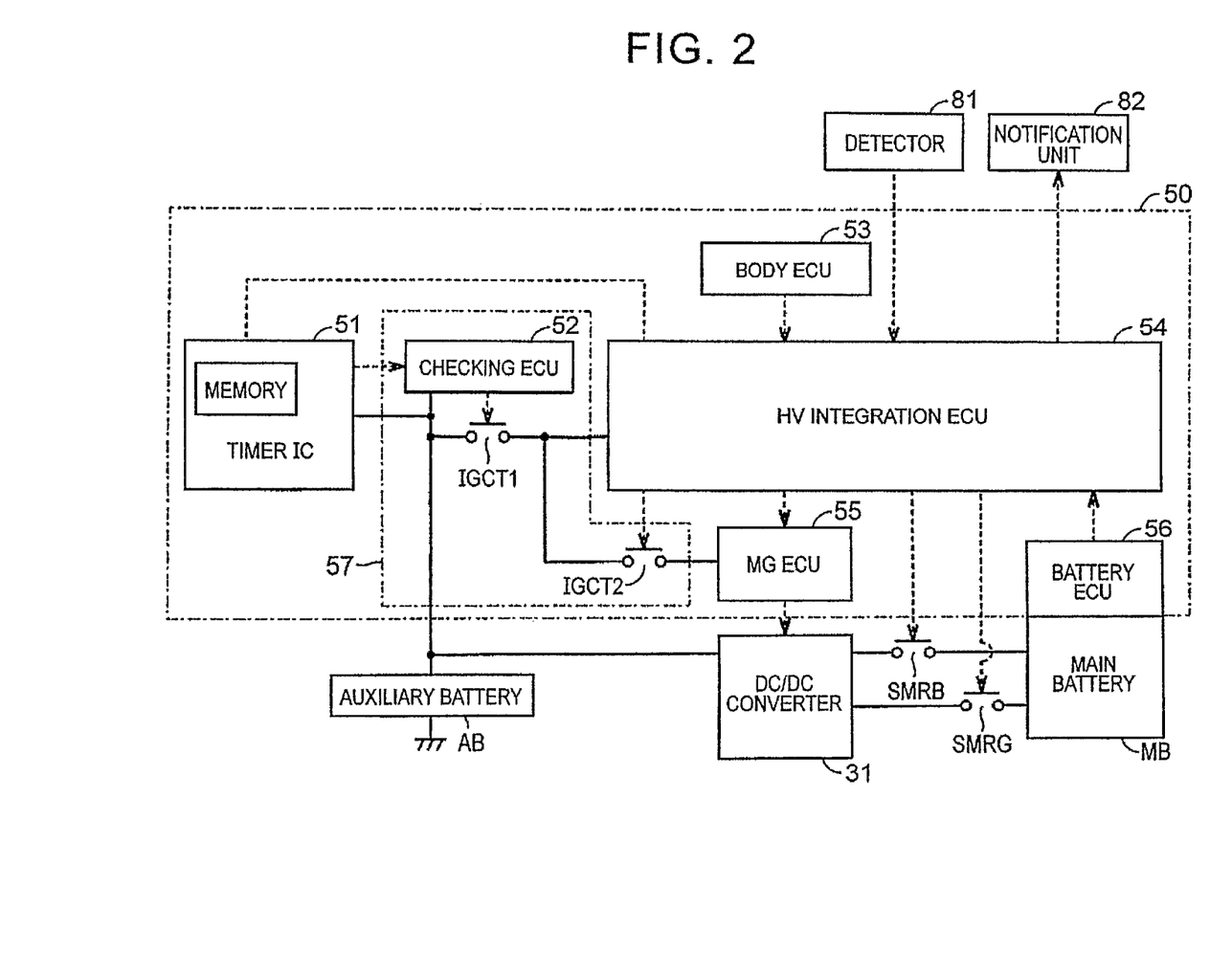
FIG. 2 is a view showing a configuration of a control device shown in FIG. 1.

FIG. 2 is a view showing the configuration of the controller 50 shown in FIG. 1 in further detail. Referring to FIG. 2, the controller 50 includes a timer integrated circuit (IC) 51, a checking electronic control unit (ECU) 52, a body ECU 53, an HV integration ECU 54, an MG-ECU 55, a battery ECU 56, and switches integrated gate-commutated thyristors (IGCT1 and IGCT2).

A power supply voltage is supplied to the controller 50 from the battery AB. The power supply voltage is supplied to the timer IC 51 and the checking ECU 52 at all times, and supplied to the HV integration ECU 54 and the MG-ECU 55 via the respective switches IGCT1 and IGCT2. The switches IGCT1 and IGCT2 may be mechanical switches such as relays or semiconductor elements such as transistors.

The checking ECU 52 and the switches IGCT1, IGCT2 operate as a power supply control unit 57 that controls the power supply to the HV integration ECU 54 and the MG-ECU 55.

The checking ECU 52 checks whether or not a signal from a remote key (not shown) carried by the user matches the vehicle. When a checking result indicates a match, the checking ECU 52 energizes the switch IGCT1 such that power is supplied to the HV integration ECU 54, and as a result, the HV integration ECU 54 is activated. In this case, the vehicle can be moved by operating various operating units in a vehicle cabin.

The timer IC 51 outputs an activation command to the checking ECU 52 when a predetermined time set in an inbuilt memory of the timer IC 51 elapses after a vehicle system is switched OFF by operating a system activation switch (not shown) or the like.

After receiving the activation command from the timer IC, the checking ECU 52 energizes the switch IGCT1 even when a signal has not been received from the remote key, whereby power is supplied to the HV integration ECU 54, with the result that the HV integration ECU 54 is activated.

The body ECU 53 detects vehicle conditions including conditions of the operating units (a start switch and so on) in the vehicle cabin, and transmits the detected vehicle conditions to the HV integration ECU 54.

The battery ECU 56 detects battery conditions including the SOC by monitoring the current IB and the voltage VB of the MB, and transmits the detected battery conditions to the HV integration ECU 54.

The HV integration ECU 54 controls the SMRB, SMRG, the MG-ECU 55, and the engine 2 on the basis of the vehicle conditions transmitted from the body ECU 53 and the battery conditions transmitted from the battery ECU 56.

The MG-ECU 55 controls the DC/DC converter 31, as well as the inverters 22, 23 and converter 21 shown in FIG. 1, under the control of the HV integration ECU 54.

Here, the HV integration ECU 54 executes charging control to adjust the output voltage Vout of the DC/DC converter 31 used to charge the AB. More specifically, the HV integration ECU 54 predicts in advance on the basis of a signal from the detector 81 whether or not the electric vehicle 100 is to be left for a long period. After predicting that the electric vehicle 100 is to be left for a long period, the HV integration ECU 54 generates a command to modify the output voltage Vout from a predetermined voltage V1 (13.5 V, for example) to a predetermined voltage V2 (15 V, for example), and outputs the generated command to the MG-ECU 55.

The predetermined voltage V2 is set to be higher than the predetermined voltage V1. Therefore, an amount of charge in the AB can be increased before the electric vehicle 100 is left for a long period. As a result, deterioration occurring when the AB is left for a long period can be suppressed. This charging control will be described in detail below.

Note that FIG. 2 shows an example of the configuration of the controller 50, to which various amendments may be made. In FIG. 2, the controller 50 includes a plurality of ECUs, but the ECUs may be integrated further such that the controller 50 is constituted by a smaller number of ECUs. Conversely, the controller 50 may be constituted by a larger number of ECUs.

Figure 3:
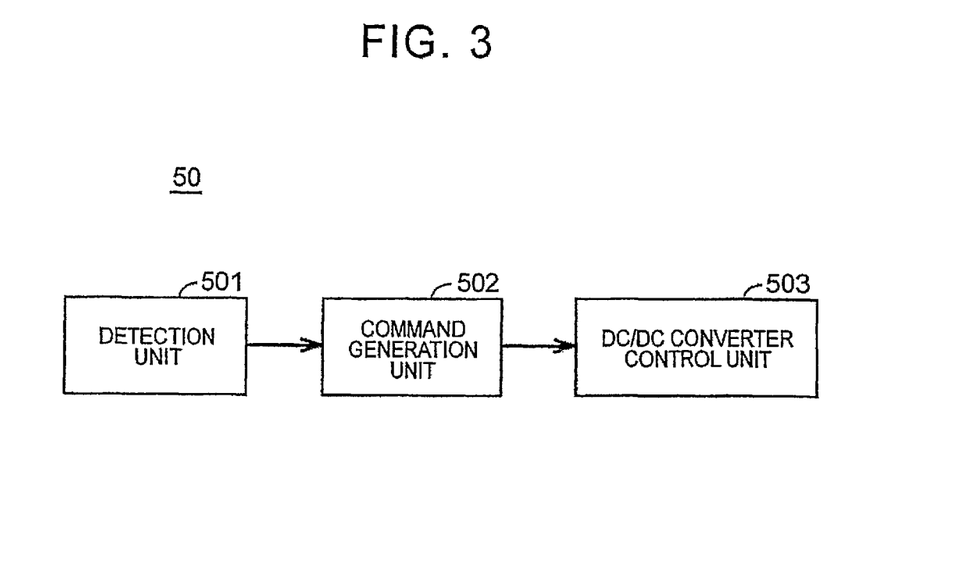
FIG. 3 is a functional block diagram relating to charging control executed by the control device shown in FIG. 1.

FIG. 3 is a functional block diagram relating to the charging control executed by the controller 50 shown in FIG. 1. Referring to FIG. 3, the controller 50 includes a detection unit 501, a command generation unit 502, and a DC/DC converter control unit 503.

The detection unit 501 determines whether or not the fuse 35 is detached (also referred to hereafter as a "fuse detached condition"). More specifically, the controller 50 determines whether or not the fuse 35 has been detached from the fuse box on the basis of the signal received from the detector 81. The detection unit 501 outputs a signal indicating the condition of the fuse 35 to the command generation unit 502.

The command generation unit 502 generates a command to set the output voltage Vout of the DC/DC converter 31 on the basis of the signal received from the detection unit 501. More specifically, when the fuse 35 is in the fuse detached condition, the command generation unit 502 generates a command to increase the output voltage Vout to the predetermined voltage V2. When the fuse 35 is not in the fuse detached condition, on the other hand, the command generation unit 502 generates a command to reduce the output voltage Vout to the predetermined voltage V1. The command generation unit 502 then outputs the generated command to the DC/DC converter control unit 503.

The DC/DC converter control unit 503 controls the DC/DC converter 31 on the basis of the command received from the command generation unit 502. More specifically, the DC/DC converter control unit 503 generates a control signal for adjusting the output voltage Vout, and outputs the generated control signal to the DC/DC converter 31.

Figure 4:
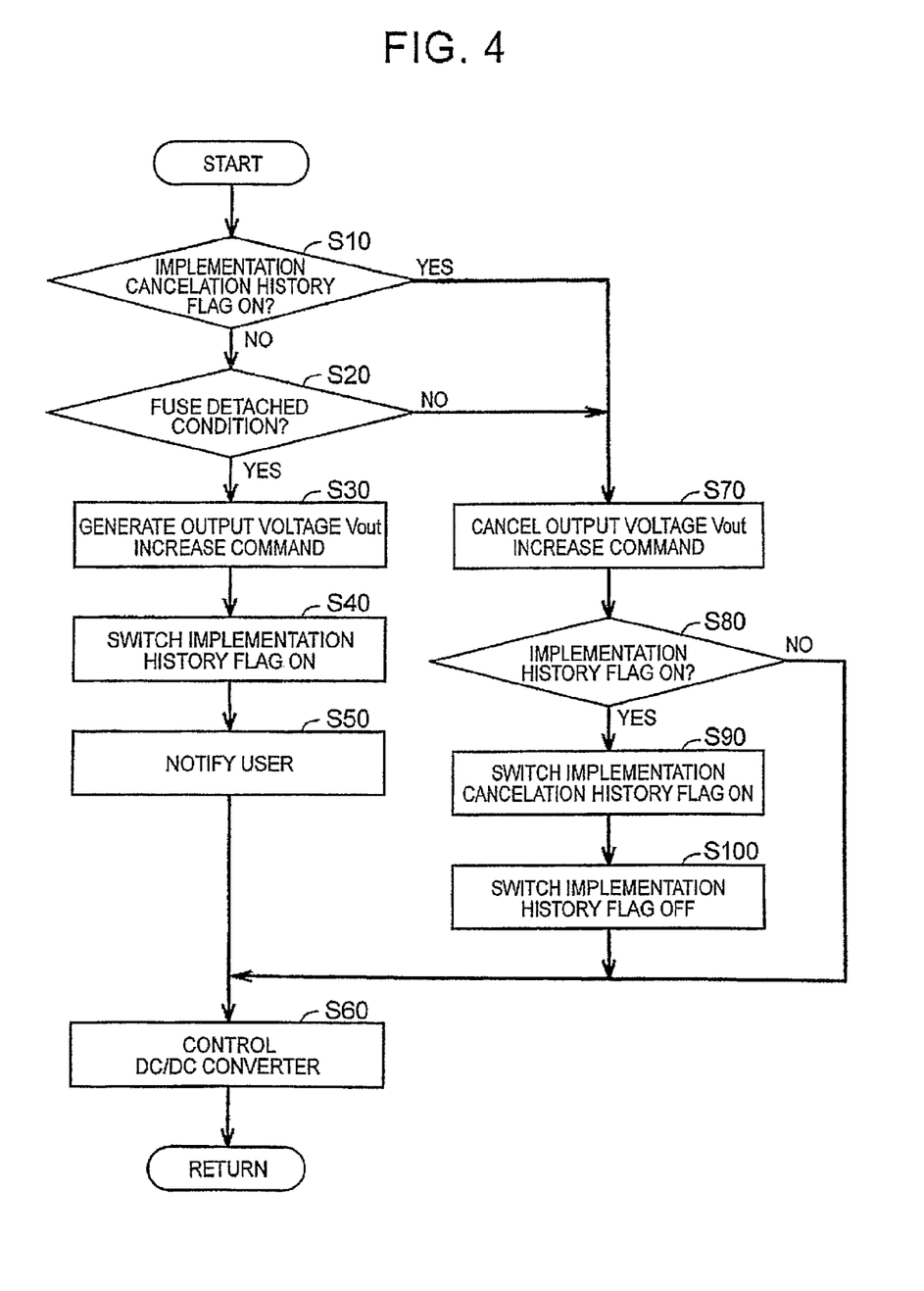
FIG. 4 is a flowchart illustrating processing procedures of the charging control executed by the control device shown in FIG. 1.

FIG. 4 is a flowchart illustrating processing procedures of the charging control executed by the controller 50 shown in FIG. 1. Note that respective steps of the flowchart shown in FIG. 4 are realized by calling up a program stored in the controller 50 in advance from a main routine, and executing the program at predetermined period intervals or in response to establishment of a predetermined condition. Alternatively, the processing may be realized by constructing dedicated hardware (electronic circuits).

Referring to FIG. 4, in step (hereafter, step will be abbreviated to S) 10, the controller 50 determines whether or not an implementation cancellation history flag is ON. The implementation cancellation history flag is a flag indicating whether or not a command to increase the output voltage Vout of the DC/DC converter 31 has been canceled. Note that in an initial condition, the implementation cancellation history flag is OFF.

When it is determined that the implementation cancellation history flag is OFF (NO in S10), the controller 50 determines whether or not the fuse 35 is in the fuse detached condition (S20). When it is determined that the fuse 35 is in the fuse detached condition (YES in S20), the controller 50 generates a command to increase the output voltage Vout (S30). More specifically, the controller 50 generates a command to increase the output voltage Vout to the predetermined voltage V2.

Next, in S40, the controller 50 switches an implementation history flag ON. The implementation history flag is a flag indicating whether or not the output voltage Vout has been increased. Note that in an initial condition, the implementation history flag is OFF. In other words, the implementation history flag is switched from OFF to ON when the output voltage Vout is increased for the first time after the electric vehicle 100 is activated.

Next, in S50, the controller 50 notifies the user that the output voltage Vout has been increased. More specifically, the controller 50 outputs information indicating that the output voltage Vout has been increased to the notification device 82. The controller 50 may also output information indicating that the AB has been shifted to a charging mode to the notification device 82. The notification device 82 notifies the user of this information. As a result, the user can learn that the output voltage Vout has been increased.

Next, in S60, the controller 50 executes control of the DC/DC converter 31. More specifically, when a command to increase the output voltage Vout has been generated, the controller 50 controls the DC/DC converter 31 to adjust the output voltage Vout to the predetermined voltage V2. When the command to increase the output voltage Vout has been canceled, on the other hand, the controller 50 controls the DC/DC converter 31 to adjust the output voltage Vout to the predetermined voltage V1.

When, on the other hand, it is determined in S20 that the fuse 35 is not in the fuse detached condition (NO in S20), the controller 50 cancels the command to increase the output voltage Vout (S70). In other words, the controller 50 sets the output voltage Vout at the predetermined voltage V1.

Next, in S80, the controller 50 determines whether or not the implementation history flag is ON. When it is determined that the implementation history flag is OFF (NO in S80), the processing advances to S60.

When it is determined that the implementation history flag is ON (YES in S80), the controller 50 switches the implementation cancellation history flag ON (S90). Next, in S100, the controller 50 switches the implementation history flag OFF, whereupon the processing advances to S60.

When, on the other hand, it is determined in S10 that the implementation cancellation history flag is ON (YES in S10), the processing advances to S70. Hence, when the increase applied to the output voltage Vout is canceled, the output voltage Vout is not increased again.

Note that the implementation history flag and the implementation cancellation history flag described above are stored in a non-volatile memory of the controller 50 such that information indicated by the flags is held even after the system of the electric vehicle 100 has been shut off.

Hence, when the fuse 35 is in the fuse detached condition, the controller 50 controls the DC/DC converter 31 to increase the output voltage Vout. When the fuse 35 is not in the fuse detached condition, on the other hand, the controller 50 cancels the increase applied to the output voltage Vout so that the output voltage Vout is reduced to a normal voltage.

Further, after the increase applied to the output voltage Vout has been canceled, the controller 50 prohibits a further increase of the output voltage Vout. In so doing, the output voltage Vout is increased only once while the electric vehicle 100 is transported following shipment.

In the above description, the processing advances to S30 when the fuse 35 is determined to be in the fuse detached condition in S20, but instead, the processing may advance to S30 when it is determined in S20 that the fuse 35 is in the fuse detached condition and the AB is in a chargeable condition. Further, the processing may advance to S30 when it is determined in S20 that the fuse 35 is in the fuse detached condition, a predetermined time has not elapsed following an operation of the fuse 35, and the AB is in the chargeable condition.

According to this embodiment, as described above, when the fuse 35 is in the shut-off condition, the output voltage Vout of the DC/DC converter 31 is increased relative to when the fuse 35 is in the power supply condition. In so doing, long-term parking of the electric vehicle 100 can be predicted in accordance with the condition of the fuse 35, and when long-term parking is predicted, the output voltage Vout of the DC/DC converter 31 can be increased. As a result, the SOC of the AB can be increased in advance, thereby preventing overdischarge during long-term parking. Hence, according to this embodiment, deterioration of the AB installed in the electric vehicle 100 can be suppressed.

Further, according to this embodiment, the controller 50 starts to increase the output voltage Vout when the detector 81 detects a switch from the power supply condition to the shut-off condition, and therefore the amount of charge in the AB can be increased using the output of the detector 81 as a start trigger.

Furthermore, according to this embodiment, the controller 50 cancels the increase applied to the output voltage Vout when the detector 81 detects a switch from the shut-off condition to the power supply condition. As a result, it is possible to prevent the auxiliary load 30 from being used in a condition where the output voltage Vout is higher than a normal operating voltage.

Further, according to this embodiment, the controller 50 prohibits increasing of the output voltage Vout after the increase applied to the output voltage Vout has been canceled. As a result, the output voltage Vout can be increased only during long-term parking such as transportation.

Moreover, according to this embodiment, the notification device 82 notifies the user of the increase in the output voltage Vout. As a result, the user can recognize that the output voltage Vout is higher than normal.

In the above description, the vehicle is an HV installed with the engine 2, but the scope of application of the invention is not limited to an HV such as that described above, and includes an electric vehicle, a fuel cell vehicle installed with a fuel cell instead of the engine 2, and so on.

In the above description, the MB may be considered as an embodiment of a "storage device" of the invention, and the fuse 35 may be considered as an embodiment of a "shut-off device" of the invention. Further, the DC/DC converter 31 may be considered as an embodiment of a "converter" of the invention.

The embodiments disclosed herein are, in all aspects, merely examples and are not be considered as limiting. The scope of the invention is indicated by the claims rather than the above description of the embodiments, and is intended to include equivalent definitions to the claims and all modifications within the scope of the claims.

What is claimed is:

1. An electric vehicle comprising:
a storage device configured to store power used for traveling;
an auxiliary battery configured to store power supplied to an auxiliary load;
a converter configured to charge the auxiliary battery by using power supplied from the storage device;
a shut-off device, separate from and external of the auxiliary load, the shut-off device configured to switch between a supply condition in which power is supplied to the auxiliary load from the auxiliary battery and a shut-off condition in which power is not supplied to the auxiliary load from the auxiliary battery; and
a controller configured to:
  initially control the converter such that an output voltage of the converter is higher when the shut-off device is in the shut-off condition than when the shut-off device is in the supply condition;
  cancel an increase applied to the output voltage when the shut-off device is switched from the shut-off condition to the supply condition; and
  in a subsequent control of the convertor to switch the shut-off device from the supply condition to the shut-off condition, not increase the output voltage after the increase applied to the output voltage has been canceled.

2. The electric vehicle according to claim 1, wherein the controller is configured to initially start increasing the output voltage when the shut-off device is switched from the supply condition to the shut-off condition.

3. The electric vehicle according to claim 1, further comprising:
a notification device configured to notify a user of an increase in the output voltage.

4. The electric vehicle according to claim 1, wherein the shut-off device is configured to be operated by a user.

5. The electric vehicle according to claim 1, wherein the shut-off device is a fuse that is attachable and detachable between the auxiliary battery and the auxiliary load.

6. The electric vehicle according to claim 1, wherein the auxiliary load is a navigation system or an audio device.

7. A method of controlling an electric vehicle including: (i) a storage device configured to store power used for traveling; (ii) an auxiliary battery configured to store power supplied to an auxiliary load; (iii) a converter configured to charge the auxiliary battery by using power supplied from the storage device; (iv) a shut-off device, separate from and external of the auxiliary load, the shut-off device configured to switch between a supply condition in which power is supplied to the auxiliary load from the auxiliary battery and a shut-off condition in which power is not supplied to the auxiliary load from the auxiliary battery; and (v) a controller, the method comprising:
initially controlling the converter, using the controller, such that an output voltage of the converter is higher when the shut-off device is in the shut-off condition than when the shut-off device is in the supply condition;
canceling an increase applied to the output voltage when the shut-off device is switched from the shut-off condition to the supply condition; and
in a subsequent control of the convertor to switch the shut-off device from the supply condition to the shut-off condition, not increasing the output voltage after the increase applied to the output voltage has been canceled.

* * * * *